(12) United States Patent
Goldy et al.

(10) Patent No.: US 12,732,221 B2
(45) Date of Patent: Sep. 8, 2026

(54) SYSTEMS AND METHODS FOR A PROTECTIVE COVER FOR A MOBILE DEVICE

(71) Applicant: Juggernaut Defense, LLC, Scottsdale, AZ (US)

(72) Inventors: Mark Goldy, Scottsdale, AZ (US); David Gruza, Scottsdale, AZ (US); William Bingman, Scottsdale, AZ (US)

(73) Assignee: Juggernaut Defense, LLC, Scottsdale, AZ (US)

( * ) Notice: Subject to any disclaimer, the term of this patent is extended or adjusted under 35 U.S.C. 154(b) by 282 days.

(21) Appl. No.: 18/489,773

(22) Filed: Oct. 18, 2023

(65) Prior Publication Data

US 2024/0137063 A1 Apr. 25, 2024
US 2024/0235600 A9 Jul. 11, 2024

Related U.S. Application Data

(60) Provisional application No. 63/417,593, filed on Oct. 19, 2022.

(51) Int. Cl.
*H04B 1/38* (2015.01)
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC ........ H04B 1/3888; H04M 1/04; H04M 1/185
See application file for complete search history.

(56) References Cited

U.S. PATENT DOCUMENTS 7,180,735 B2 * 2/2007 Thomas .................. G06F 1/182 361/679.56
9,861,001 B1 * 1/2018 Miller .................. G06F 1/1628
10,924,148 B2 * 2/2021 Holtz .................. H04M 1/185
2012/0037524 A1 * 2/2012 Lonsdale, II ......... G06F 1/1656 206/320
2013/0294020 A1 * 11/2013 Rayner ................. G06F 1/1626 361/679.01
2014/0152890 A1 * 6/2014 Rayner .................. H04N 23/51 277/312
2014/0233167 A1 * 8/2014 Rayner ................. G06F 1/1656 361/679.3
2014/0268519 A1 * 9/2014 Huang ................. H04B 1/3888 361/679.01
2020/0304620 A1 * 9/2020 Wang ..................... A45C 11/00
2020/0351396 A1 * 11/2020 Poon ....................... H04M 1/04
2024/0235600 A9 * 7/2024 Goldy ..................... H04M 1/04
2024/0359311 A1 * 10/2024 Chen .................. B65D 21/0201

* cited by examiner

*Primary Examiner* — Md K Talukder
(74) *Attorney, Agent, or Firm* — Polsinelli PC

(57) ABSTRACT

A protective cover for a mobile device includes reinforced crush structures along peripheral sides of the protective cover that absorb or deflect forces that may otherwise damage the mobile device. Further, the protective cover includes cutout portions along peripheral sides of a rigid body of the protective cover that provides improved deflection of a portion of the rigid body to enable the protective cover to receive or release the mobile device and can also provide flexibility for the rigid body along the corners if dropped. In one aspect, a pliable body can be formed around the rigid body and includes various structural features that mechanically couple with one another along all three axes in 3-D space to reduce the chance of unintentional decoupling.

19 Claims, 12 Drawing Sheets

SYSTEMS AND METHODS FOR A PROTECTIVE COVER FOR A MOBILE DEVICE

CROSS-REFERENCE TO RELATED APPLICATIONS

This is a U.S. Non-Provisional Patent Application that claims benefit to U.S. Provisional Patent Application Ser. No. 63/417,593 filed 19 Oct. 2022, which is herein incorporated by reference in its entirety.

FIELD

The present disclosure generally relates to protective covers for mobile devices.

BACKGROUND

Existing protective covers for mobile devices often have certain pitfalls, including the tendency for pliable portions of the protective cover to pull away from rigid portions of the protective cover, breakage of the protective cover over time at deflection points, and breakage or fracturing of rigid portions of the protective cover when dropped.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

A protective cover for a mobile device includes reinforced crush structures along peripheral sides of the protective cover that absorb or deflect forces that may otherwise damage the mobile device. In particular, the protective cover includes pliable crush ribs paired with rigid crush ribs that protrude along peripheral sides and corners of the protective cover, where in some cases the pliable crush ribs can contact an external surface before the rigid crush ribs, thereby reducing the likelihood of cracking. The pliable crush ribs can help protect the mobile device for low-energy impacts and the rigid crush rubs can help protect the mobile device for high-energy impacts.

Further, the protective cover includes cutout portions along peripheral sides of a rigid body of the protective cover that provides improved deflection of a portion of the rigid body to enable the protective cover to receive or release the mobile device and can also provide flexibility for the rigid body along the corners if dropped. The cutout portions of the rigid body can be cushioned by a pliable body of the protective cover, which can absorb forces associated with deformation of the rigid body in the event of the second type.

In one aspect, the rigid body and the pliable body include various structural features that mechanically couple with one another along all three axes in 3-D space to reduce the chance of unintentional decoupling. The mechanical engagement of the rigid body with the pliable body ensures that the rigid body and the pliable body remain coupled with one another when a portion of the rigid body is being deflected. In a further aspect, when coupled together, the pliable body can be of a single piece construction that is present along both an interior and an exterior of the rigid body to protect the mobile device and absorb impact forces.

In addition, the pliable body defines a display bezel that seals against the mobile device when the mobile device is captured within the cavity; the display bezel includes corner bezel reliefs that reduce stretching and tearing of the pliable body especially during deflection of the top of the rigid body.

Figure 1A:
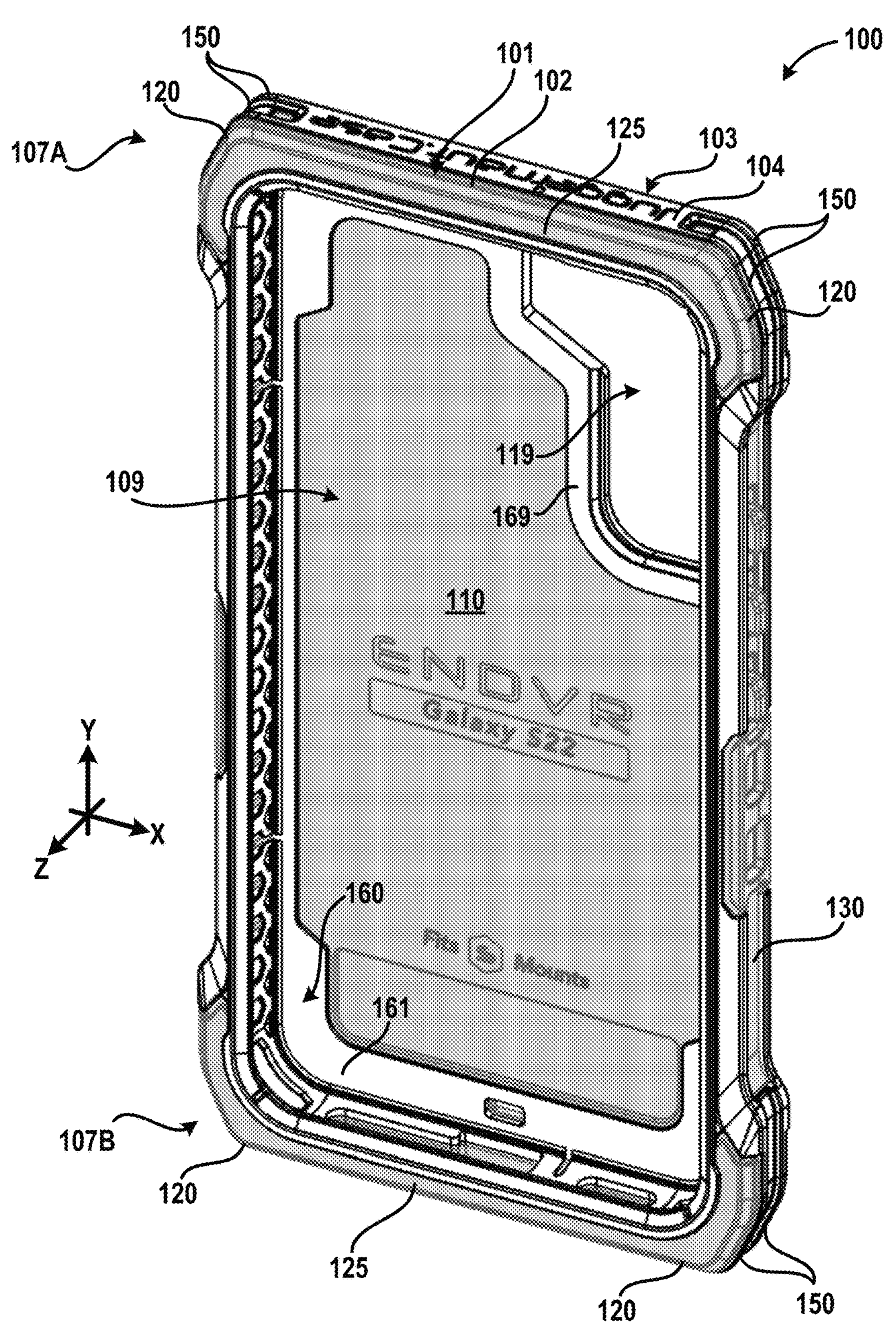
FIG. 1A is a front perspective view showing a protective case for a mobile device.
Figure 1B:
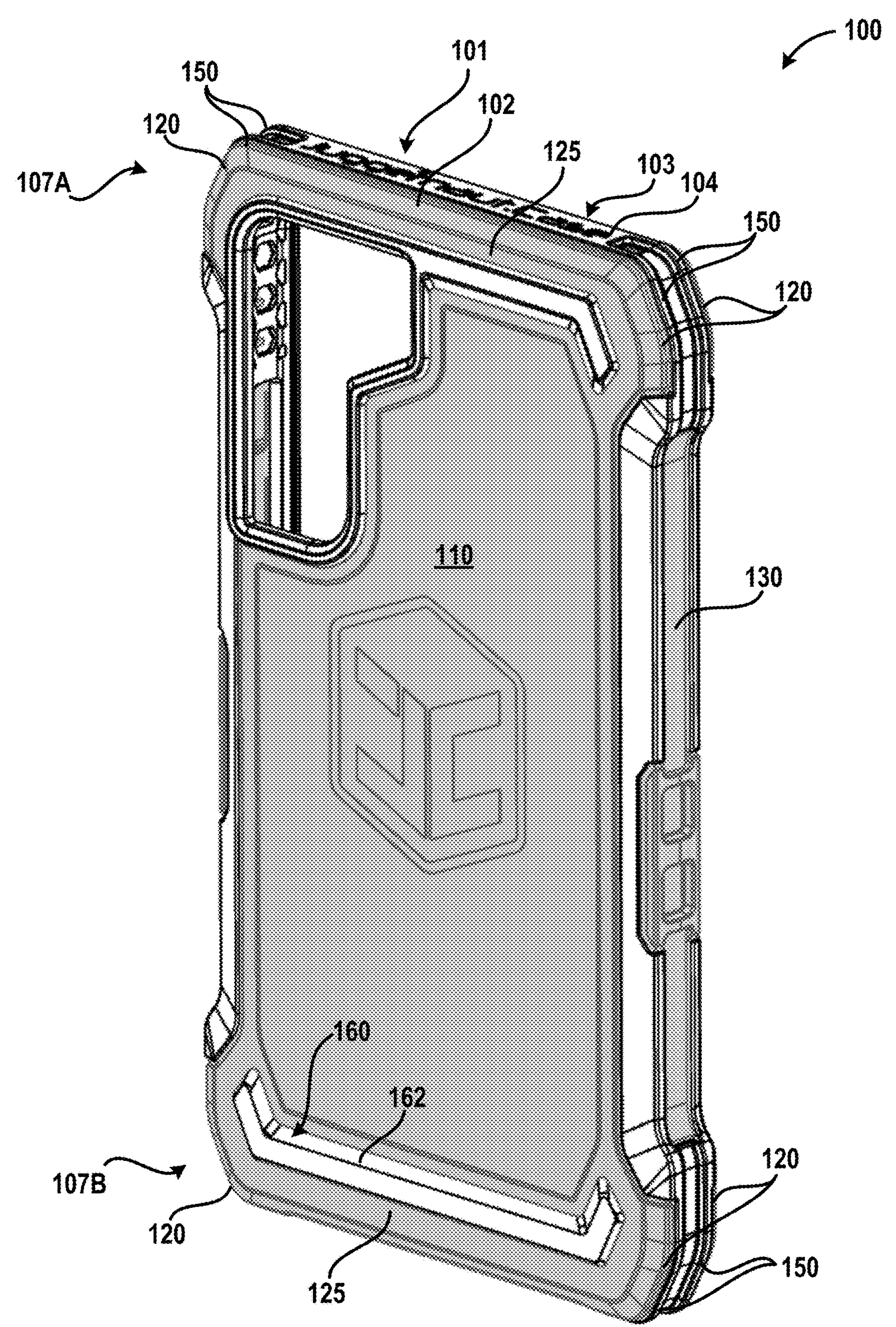
FIG. 1B is a rear perspective view showing the protective case of FIG. 1A.
Figure 1C:
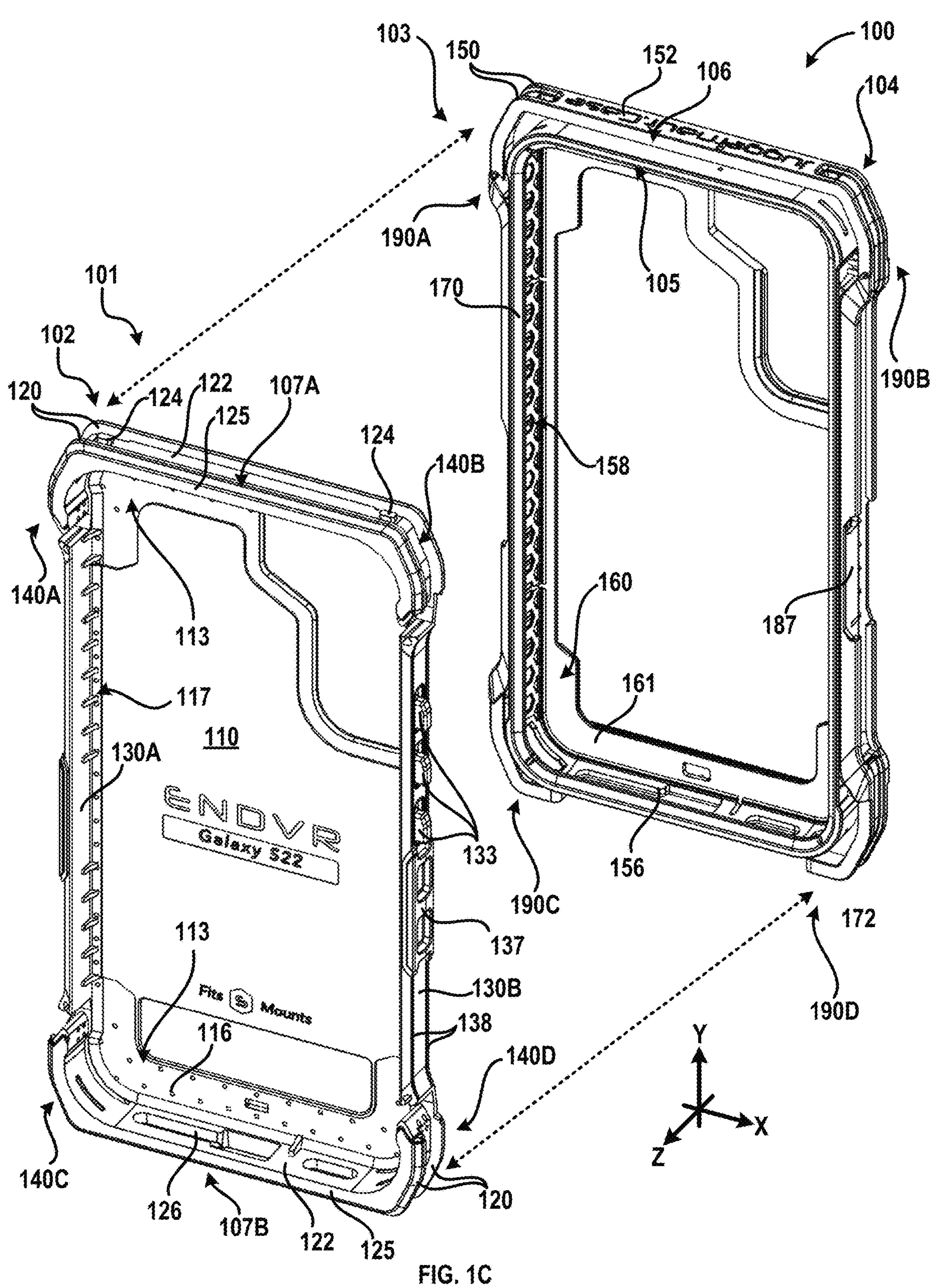
FIG. 1C is an exploded view showing the protective case of FIG. 1A.

FIGS. 1A-1C illustrate a protective cover 100 for a mobile device, the protective cover 100 including a rigid body 101 coupled with a pliable body 103 that collectively define a cavity 109 for capture of the mobile device therein. In some examples, the pliable body 103 can be molded around the rigid body 101.

The rigid body 101 can include a rigid crush perimeter 102 that encapsulates the sides of the mobile device, the rigid crush perimeter 102 including one or more rigid crush ribs 120 along a first peripheral side 107A and a second peripheral side 107B of the rigid body 101. The pliable body 103 can at least partially encapsulate the rigid crush perimeter 102, and can include a pliable crush perimeter 104 including one or more pliable crush ribs 150 along the one or more rigid crush ribs 120 of the rigid crush perimeter 102.

As shown in FIG. 1C, the pliable crush perimeter 104 can include an inner membrane 105 that lines an interior of the rigid crush perimeter 102 and contacts a mobile device when the mobile device is positioned within a cavity 109 of the rigid body 101. The inner membrane 105 can also define a display bezel 170 that surrounds a display of the mobile device when the mobile device is captured within the cavity 109. Notably, the display bezel 170 can include a plurality of corner bezel reliefs 172 configured to reduce stretching of the inner membrane 105. In some examples, the inner membrane 105 can include a plurality of geometric recesses 158 that provide impact absorption for the mobile device when the mobile device is positioned within the cavity 109; in the example shown, the plurality of geometric recesses 158 are hexagon-shaped.

Further, the pliable crush perimeter 104 can include an outer membrane 106 that includes the one or more pliable crush ribs 150. The outer membrane 106 can at least partially encapsulate an exterior of the rigid crush perimeter 102 such that the one or more pliable crush ribs 150 extend beyond the rigid crush perimeter 102.

Figure 1D:
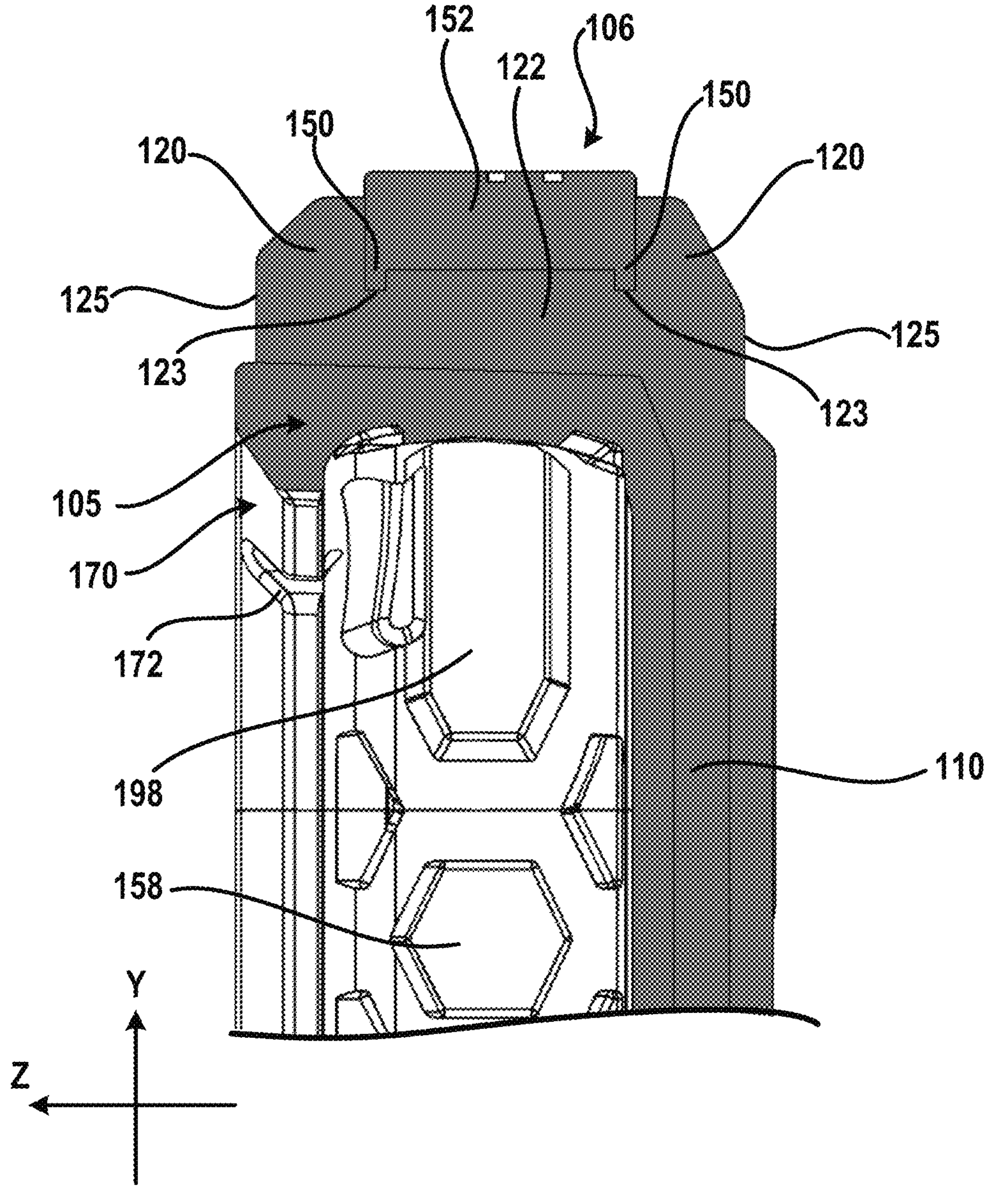
FIG. 1D is a cross-sectional side view showing a first peripheral side of the protective case of FIG. 1A.

The rigid crush perimeter 102 can include a rigid crush wall 122 along the first peripheral side 107A or the second peripheral side 107B between the one or more rigid crush ribs 120. As such, the outer membrane 106 can include a pliable crush wall 152 associated with the one or more pliable crush ribs 150 that extends beyond the rigid crush perimeter 102 and also encapsulates the rigid crush wall 122. The rigid crush wall 122 can include one or more outward-facing protrusions 124 that couple with respective pliable crush wall apertures 154 (FIG. 2E) of the pliable body 103. Further, as shown in the cross-sectional view of FIG. 1D, the rigid crush wall 122 includes one or more channels 123 that also couple with the one or more pliable crush ribs 150 of the pliable body 103.

As further shown, the first peripheral side 107A and the second peripheral side 107B of the rigid body 101 can each include one or more rigid exterior faces 125. The one or more rigid exterior faces 125 can each be associated with a respective rigid crush rib 120, where the associated rigid crush rib 120 can serve as a transition between the rigid crush wall 122 and the associated rigid exterior face 125. When coupled with the pliable body 103, the inner membrane 105 and outer membrane 106 of the pliable body 103 can collectively frame the edges of the one or more rigid exterior faces 125 while the one or more rigid exterior faces 125 remain exposed.

With additional reference to FIGS. 2A-2G, the rigid crush perimeter 102 can include a corner 140 associated with the first peripheral side 107A or the second peripheral side 107B of the rigid body 101. Likewise, the outer membrane 106 of the pliable crush perimeter 104 includes a corner membrane 190 that encapsulates the corner 140. The corner 140 of the rigid crush perimeter 102 can include a tongue portion 141 that terminates in a free end portion 142, the tongue portion 141 being associated with a rigid crush rib 120 of the one or more rigid crush ribs 120 of the rigid crush perimeter 102. The corner membrane 190 of the pliable crush perimeter 104 can include an interior void 199 that is configured to receive the tongue portion 141. The corner 140 of the rigid crush perimeter 102 can further include a cutout portion 144 that separates the tongue portion 141 from a web 110 of the rigid body 101 and allows flexion of the rigid crush rib 120 and the rigid crush wall 122 of the rigid crush perimeter 102 away from a default position.

The first peripheral side 107A of the rigid crush perimeter 102 can include first and second corners 140A and 140B, where the one or more rigid crush ribs 120 of the first peripheral side 107A extend along the rigid crush wall 122 and along the first and second corners 140A and 140B. The pliable crush perimeter 104 can likewise include first and second corner membranes 190A and 190B, where the one or more pliable crush ribs 150 extend along the pliable crush wall 152 and along the first and second corner membranes 190A and 190B to provide cushioning for the one or more rigid crush ribs 120 of the rigid crush perimeter 102. Similarly, the second peripheral side 107B of the rigid crush perimeter 102 can include third and fourth corners 140C and 140D, where the one or more rigid crush ribs 120 of the second peripheral side 107B extend along the rigid crush wall 122 and along the third and fourth corners 140C and 140D. The pliable crush perimeter 104 can likewise include third and fourth corner membranes 190C and 190D, where the one or more pliable crush ribs 150 extend along the pliable crush wall 152 and along the third and fourth corner membranes 190C and 190D to provide cushioning for the one or more rigid crush ribs 120 of the rigid crush perimeter 102.

The tongue portion 141 can be in part defined by the cutout portion 144, which can have a first cutout segment 145 and a second cutout segment 146. The cutout portion 144 allows flexion of a portion of the first peripheral side 107A or the second peripheral side 107B of the rigid crush perimeter 102 away from a default position. The first cutout segment 145 is horizontally oriented between the free end portion 142 of the tongue portion 141 and a lateral side 130 of the rigid crush perimeter 102 to separate the tongue portion 141 from the lateral side 130. The second cutout segment 146 is vertically oriented between a web 110 of the rigid body 101 and the tongue portion 141 to separate the tongue portion 141 from the web 110. In a primary embodiment, the first cutout segment 145 and the second cutout segment 146 are substantially perpendicular to one another (e.g., form a 90-degree angle relative to one another). The tongue portion 141 and the cutout portion 144 collectively enable deflection of the first peripheral side 107A or the second peripheral side 107B away from a default position to enable the protective cover 100 to receive or release the mobile device. In a further aspect, the tongue portion 141 and the cutout portion 144 collectively enable the rigid body 101 to flex very slightly upon impact at the associated first peripheral side 107A or second peripheral side 107B (including any corner 140) and absorb impact forces, thereby reducing the chance of fracture or breakage of the rigid body 101 when dropped.

To absorb impact forces associated with flexion of components of the rigid crush perimeter 102 away from the default position, the corner membrane 190 of the pliable crush perimeter 104 includes a pliable spacer 194 that cushions the rigid crush rib 120 and the rigid crush wall 122 and fills in the cutout portion 144 of the rigid crush perimeter 102. In particular, the pliable spacer 194 can include a first pliable spacer portion 195 that can be horizontally-oriented and positioned within the first cutout segment 145, and can also include a second pliable spacer portion 196 that can be vertically-oriented and positioned within the second cutout segment 146.

In some embodiments, the tongue portion 141 includes a rigid corner crush pocket 148. Likewise, the corner membrane 190 of the pliable crush perimeter 104 includes a pliable corner crush pocket 198 formed along an interior surface of the corner membrane 190 that aligns with the rigid corner crush pocket 148.

To prevent decoupling of the pliable body 103 from the rigid body 101 during flexion of a portion of the rigid crush perimeter 102 away from a default position, e.g., such as when removing the mobile phone, the free end portion 142 of the tongue portion 141 defines a plurality of corner coupling interlock elements 147, and the corner membrane 190 includes a plurality of complementary corner coupling interlock elements 197 that insert into the plurality of corner coupling interlock elements 147. The plurality of complementary corner coupling interlock elements 197 can be defined through their associated interior void 199, and can be angled very slightly towards or away from the X direction, the Y direction, or the Z direction to further secure the pliable body 103 to the rigid body 101 and prevent unintentional decoupling.

Figures 2A, 2B:
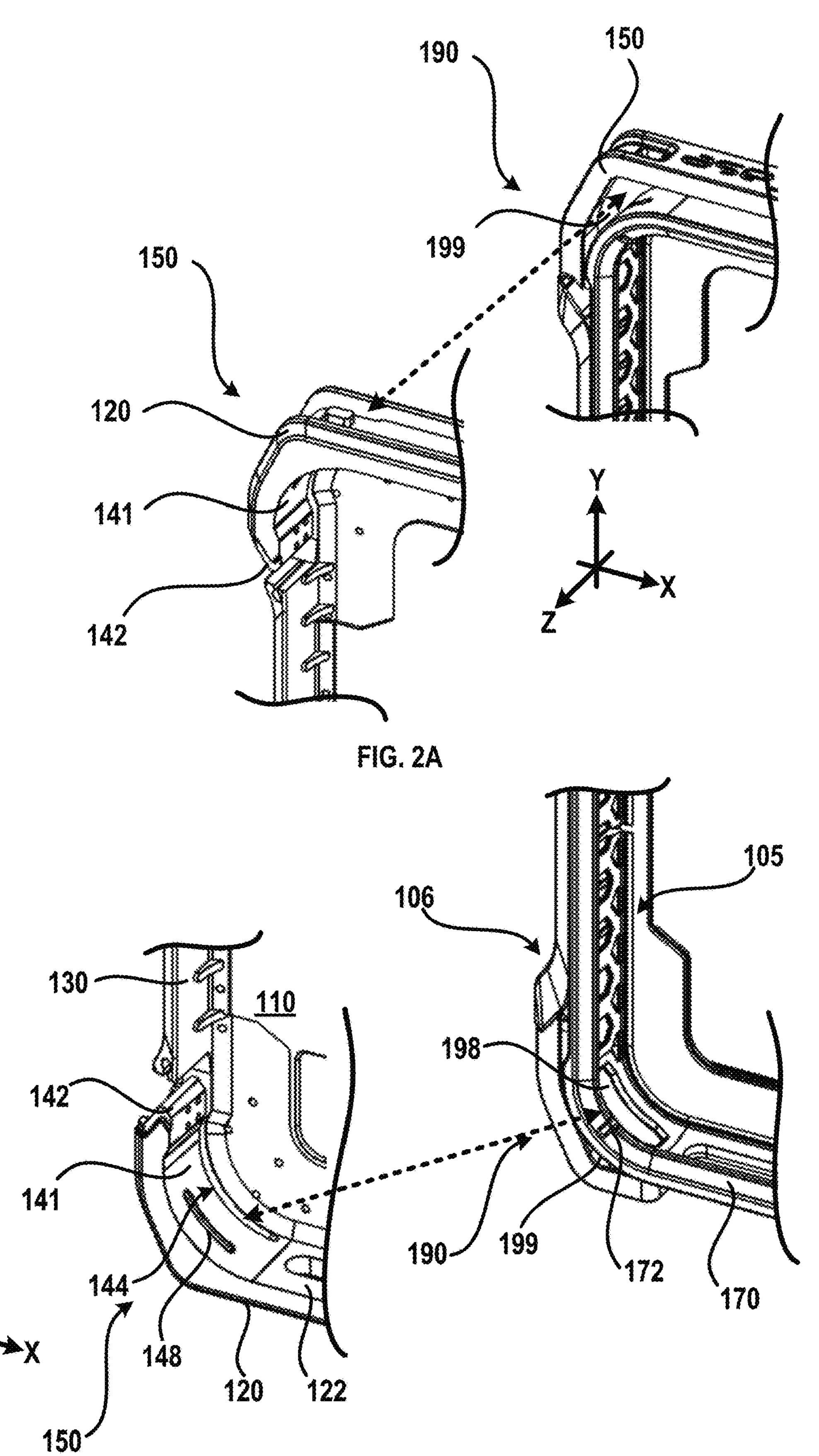
FIG. 2A is an enlarged view showing a first corner of the protective case of FIG. 1C.
FIG. 2B is an enlarged view showing a third corner of the protective case of FIG. 1C.
Figures 2C, 2D:
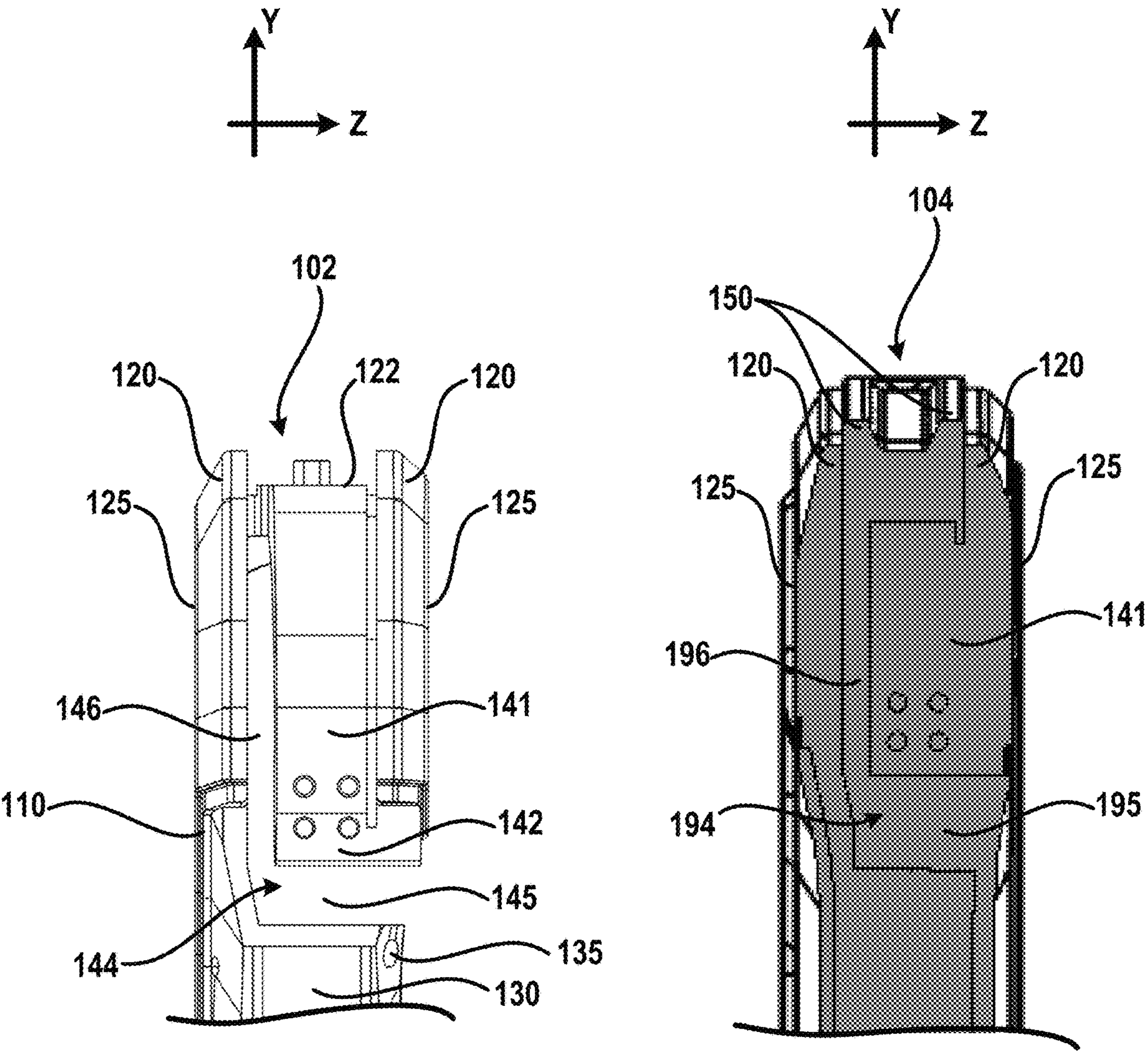
FIG. 2C is an enlarged side view showing the first corner of a rigid body of the protective case of FIG. 1A.
FIG. 2D is an enlarged cross-sectional side view showing the first corner of the protective case of FIG. 1A.
Figure 2E:
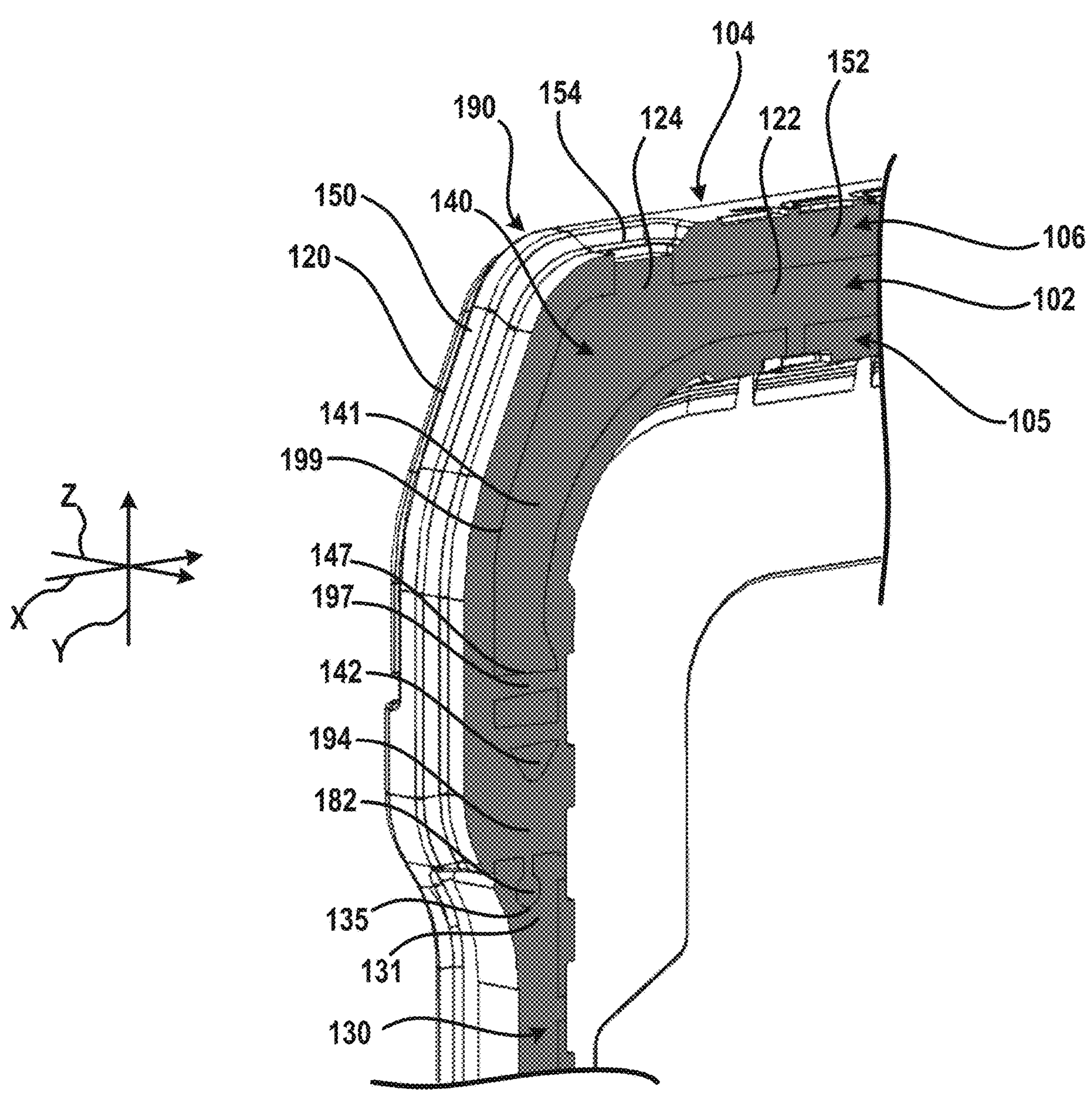
FIG. 2E is an enlarged cross-sectional front perspective view showing the first corner of the protective case of FIG. 1A.
Figure 2F:
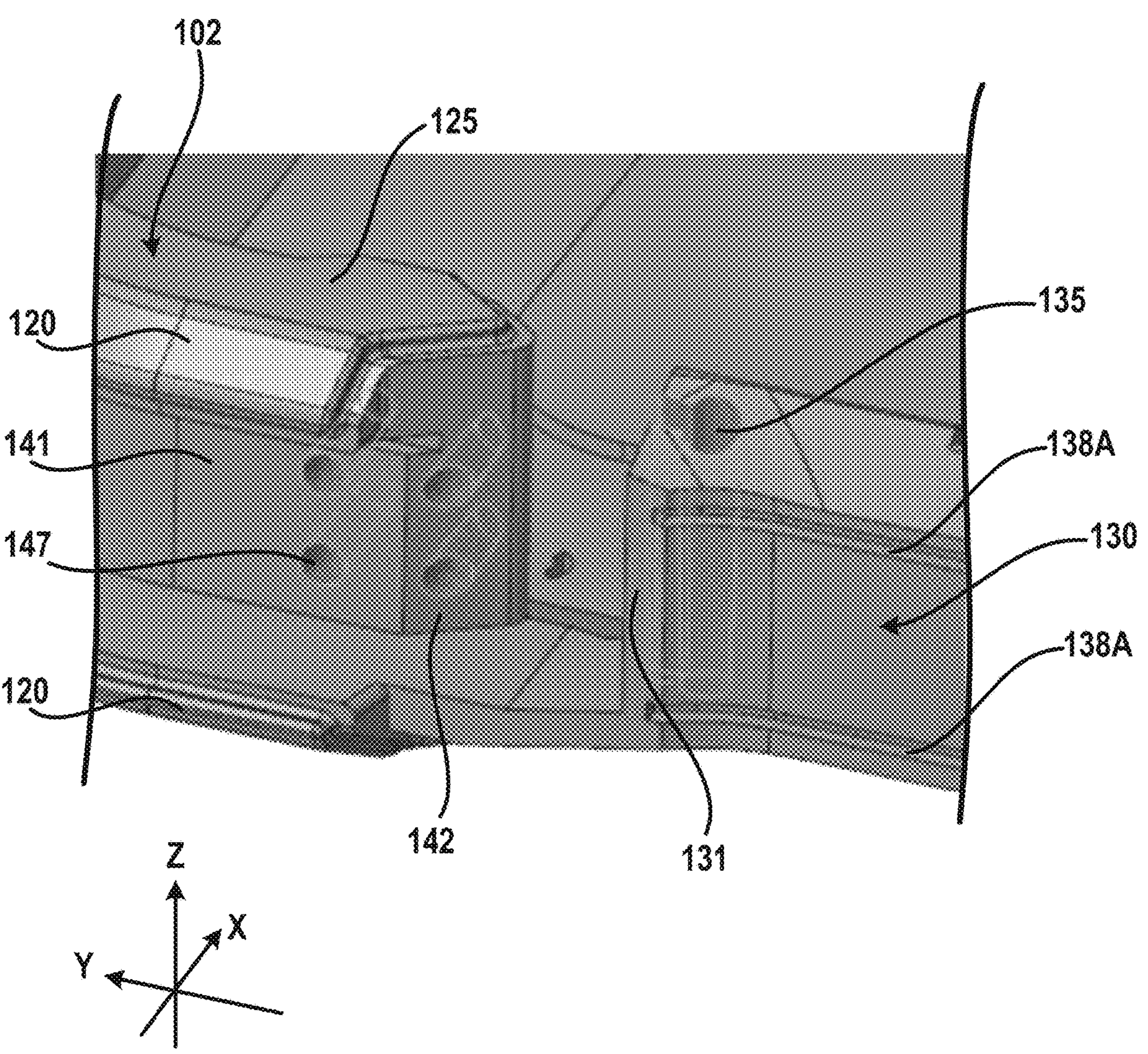
FIG. 2F is an enlarged perspective view showing mechanical interlocking portions of the first corner of the protective case of FIG. 1A.

As shown in FIG. 2E, the pliable spacer 194 can also include a complementary mechanical interlock element 182 that engages a mechanical interlock element 135 of a lateral side 130 (e.g., first or second lateral side 130A or 130B) of the rigid crush perimeter 102 to prevent decoupling of the rigid body 101 from the pliable body 103 during flexion of the first peripheral side 107A or the second peripheral side 107B of the rigid crush perimeter 102 away from the default position. The lateral side 130 of the rigid crush perimeter 102 can include an end portion 131 that defines the mechanical interlock element 135.

Figure 3:
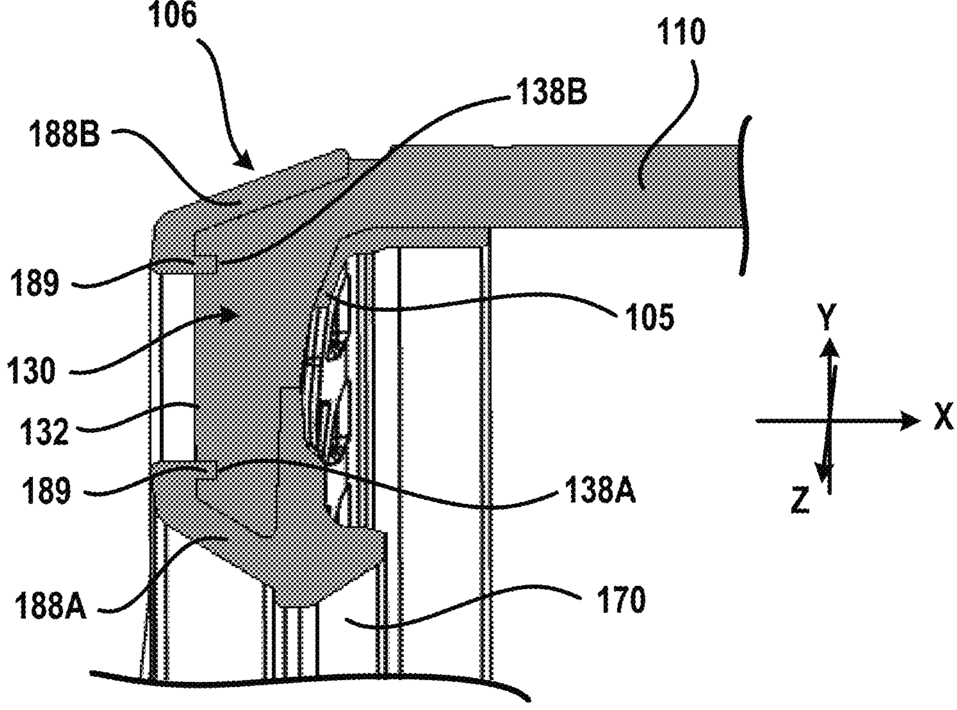
FIG. 3 is an enlarged cutaway view showing a lateral side of the protective case of FIG. 1A.

Referring to FIG. 3, the lateral side 130 of the rigid crush perimeter 102 can also include an outer lateral surface 132, which can include one or more lateral channels 138. The outer membrane 106 of the pliable crush perimeter 104 can define an angled capture section (shown in the figures as front angled capture section 188A and rear angled capture section 188B) that captures a portion of the outer lateral surface 132 of the lateral side 130 of the rigid crush perimeter 102. In some examples, the angled capture section can include an end capture element 189 that seats within a corresponding lateral channel 138 of the rigid crush perimeter 102 to secure the pliable crush perimeter 104 to the lateral side 130 of the rigid crush perimeter 102.

In the examples shown, each lateral side 130 of the rigid crush perimeter 102 can include two lateral channels 138A and 138B. Thus, for each lateral side 130, the outer membrane 106 of the pliable crush perimeter 104 can include a front angled capture section 188A that extends from a front of the outer membrane 106 towards a rear of the outer membrane 106 as shown. The front angled capture section 188A is configured to capture a first lateral channel 138A of the of the rigid crush perimeter 102. Similarly, for each lateral side 130, the outer membrane 106 of the pliable crush perimeter 104 can include a rear angled capture section 188B that extends from a rear of the outer membrane 106 towards a front of the outer membrane 106 as shown. The rear angled capture section 188B is configured to capture a second lateral channel 138B of the of the rigid crush perimeter 102.

In some examples, as visible in FIG. 1C, the lateral side 130 can be interrupted by a gripping section 137 as shown that provides a gripping surface for a user; the outer membrane 106 can include a gripping section void 187 that receives the gripping section 137. Further, in some examples, the lateral side 130 of the rigid body 101 includes a plurality of buttons 133 that align with one or more buttons of the mobile device; in some examples, each button 133 of the plurality of buttons 133 includes a respective button cutout that enables a user to press the associated button 133 inward to activate one or more respective buttons of the mobile device. Depending on the type of mobile device, the arrangement and orientation of the buttons 133 may vary. For example, the buttons 133 may also be present along the first or second peripheral sides 107A or 107B (e.g., along a top) of the protective cover 100.

Figure 4A:
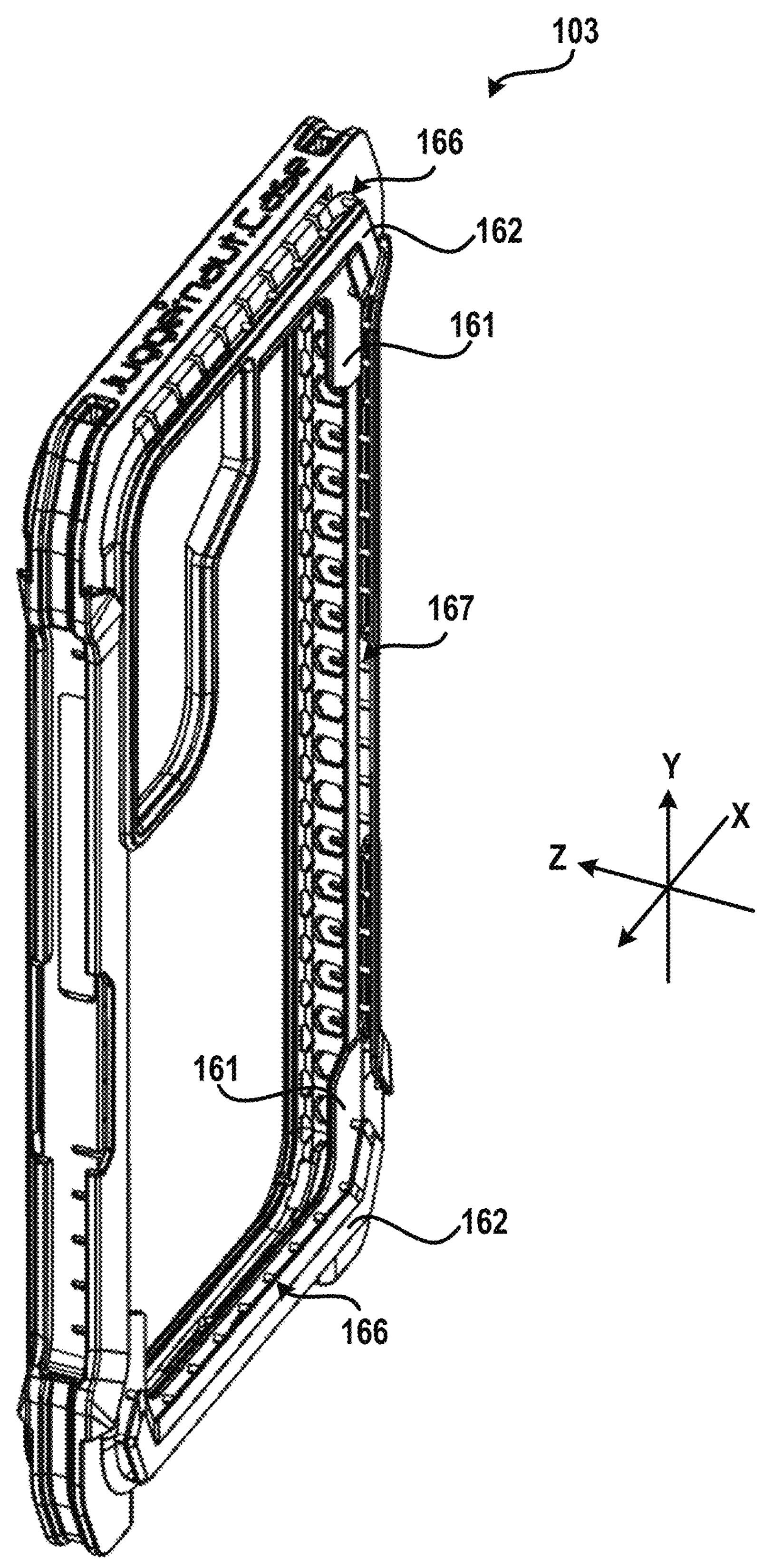
FIG. 4A is a rear perspective view showing a pliable body of the protective case of FIG. 1A.
Figure 4B:
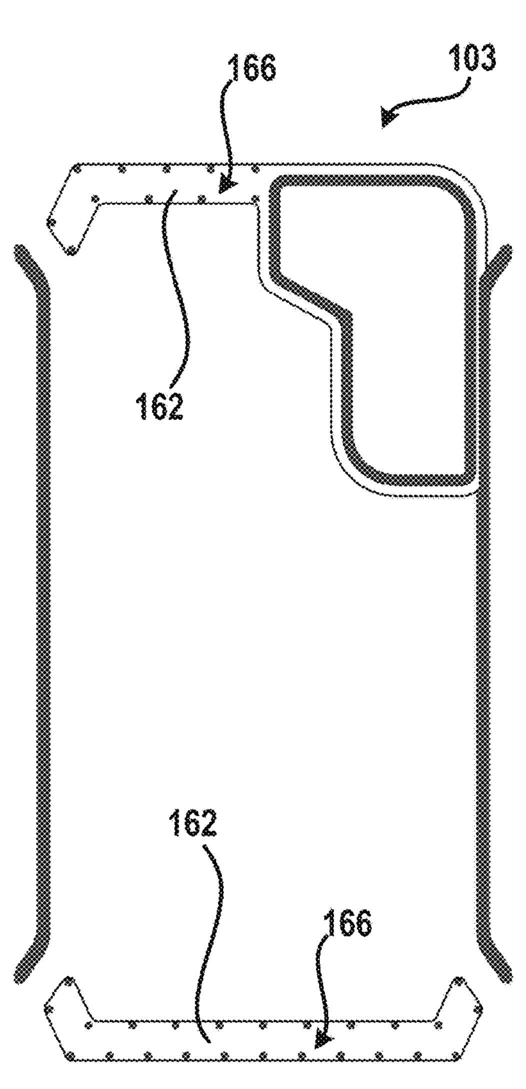
FIG. 4B is a cross-sectional front view showing an inner layer of a web window of the pliable body of the protective case of FIG. 4A.
Figure 4C:
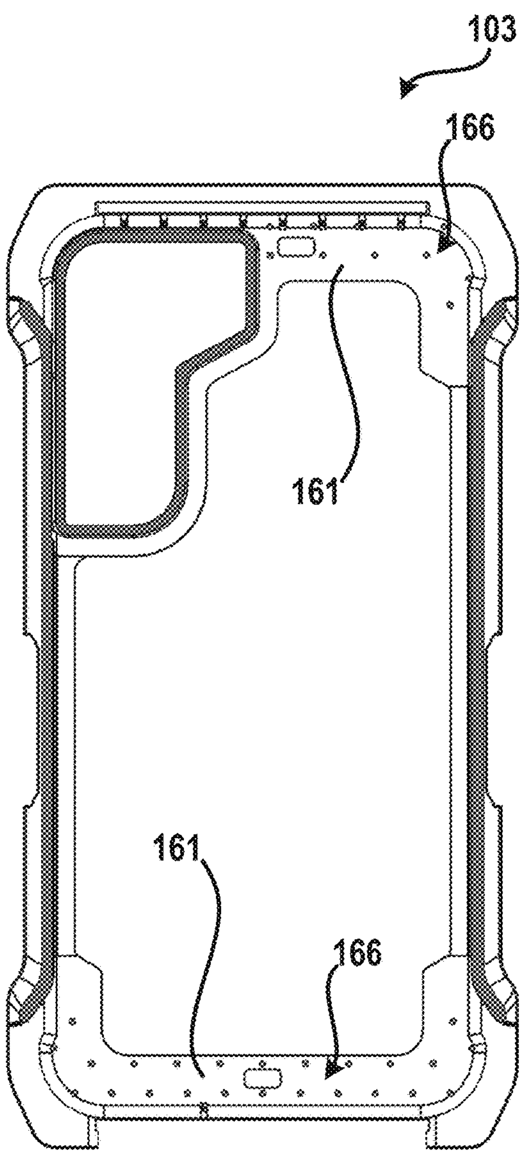
FIG. 4C is a cross-sectional rear view showing an outer layer of a web window of the pliable body of the protective case of FIG. 4A.

In a further aspect, with additional reference to FIGS. 4A-4C, the rigid body 101 includes a web 110 that spans the rigid crush perimeter 102, and the pliable crush perimeter 104 can include a web window 160 that encapsulates portions of the web 110 along both an interior of the web 110 and an exterior of the web 110. The web 110 and the rigid crush perimeter 102 of the rigid body 101 include various interlocking features that interlock with the web window 160 and the pliable crush perimeter 104 of the pliable body 103 to secure the rigid body 101 to the pliable body 103. In some examples, the web 110 includes one or more coupling sections 113 that include a plurality of web perforations 116. The web window 160 of the pliable crush perimeter 104 can have an inner layer 161, an outer layer 162, and a plurality of web connectors 166 that connect the inner layer 161 to the outer layer 162 through the plurality of web perforations 116, e.g., such that the inner layer 161 and the outer layer 162 are one integral piece. In addition, the web 110 can include a plurality of peripheral web interlock elements 117 (FIG. 1C) that engage respective complementary peripheral web interlock elements 167 (FIG. 4A) of the inner membrane 105 to further secure the pliable body 103 to the rigid body 101.

The web 110 of the rigid body 101 also provides a lens window 119 configured to receive a lens of the mobile device; note that the shape, size and placement of the lens window 119 can vary based on the model of mobile device. The web window 160 of the pliable body 103 also provides a lens bezel 169 configured to frame the lens window 119 of the rigid body 101; note that the shape, size and placement of the lens bezel 169 can vary based on the model of mobile device.

The second peripheral side 107B of the rigid crush perimeter 102 can be configured to capture a lower side of the mobile device. The second peripheral side 107B includes one or more cable apertures 126 that enable connection of charging and/or data cables with the mobile device while the mobile device is captured within the protective cover 100. The pliable crush perimeter 104 can be configured to couple along second peripheral side 107B of the rigid crush perimeter 102 and can similarly include one or more pliable cable apertures 156 that align with the plurality of cable apertures 126.

The protective cover 100 notably includes several mechanical interlocking features described above that secure the pliable body 103 to the rigid body 101 along all three directional axes (X, Y and Z axes). The mechanical interlocking features can be defined in terms of the three directional axes which will be described in this section. Notably, each mechanical interlocking feature can "point along" in alignment with one or more axes, and "run along" in alignment with one or more axes. In particular, a feature that "points along" a direction as described in this context can be interpreted as a "free end" of the feature starts and ends along a particular direction; conversely, a feature that "runs along" a direction as described in this context can be interpreted as the feature being defined along a particular direction but does not necessarily point along that direction. For instance, the one or more channels 123 of the rigid crush wall 122 is configured to couple with central segments of the one or more pliable crush ribs 150 of the pliable body 103; the one or more channels 123 and the central segments of the one or more pliable crush ribs 150 "point" in alignment with the Y direction and "run" in alignment with the X direction. In another example, the mechanical interlock element 135 of the rigid body 101 couples with the complementary mechanical interlock element 182 of the pliable body 103, where they both "point" in alignment with the Y direction but "run" in alignment with the Z direction.

This section summarizes the mechanical interlocking features of the protective cover 100 including pairings and directional alignment. The following mechanical interlocking features collectively resist unintentional decoupling of the pliable body 103 from the rigid body 101 by aligning along different axes. For instance, continuing with the example of the mechanical interlock element 135 and the complementary mechanical interlock element 182, these features prevent unintentional decoupling of the pliable body 103 from the rigid body 101 by locking the pliable body 103 and the rigid body 101 together in the Y direction and by requiring a user to deliberately pull the complementary mechanical interlock element 182 away from the associated mechanical interlock element 135 in the Z direction. However, to fully decouple the pliable body 103 from the rigid body 101, a user would also need to deliberately decouple other mechanical interlocking features which would require additional manipulation along the X, Y and Z directions. As such, by defining the mechanical interlocking features along different directions, the protective cover 100 prevents unintentional decoupling of the pliable body 103 from the rigid body 101; a user could not fully decouple the pliable body 103 from the rigid body 101 by accident or with a single motion.

As discussed, the plurality of web perforations 116 of the rigid body 101 couple with the plurality of web connectors 166 of the pliable body 103; the plurality of web perforations 116 and the plurality of web connectors 166 each point along the Z direction, and run along the X direction.

Similarly, the rigid body 101 includes the plurality of peripheral web interlock elements 117 that engage respective complementary peripheral web interlock elements 167 of the pliable body 103; the plurality of peripheral web interlock elements 117 and the plurality of complementary peripheral web interlock elements 167 each point along the Z direction and run along the Y direction. Note that a subset of the peripheral web interlock elements 117 and the plurality of complementary peripheral web interlock elements 167 corresponding with the lateral sides 130 of the protective cover 100 point along the X direction, and another subset of the peripheral web interlock elements 117 and the plurality of complementary peripheral web interlock elements 167 corresponding with the first or second peripheral sides 107A or 107B of the protective cover 100 point along the Y direction. The peripheral web interlock elements 117 and the plurality of complementary peripheral web interlock elements 167 all run along the Z direction.

The one or more outward-facing protrusions 124 that couple with respective pliable crush wall apertures 154 of the pliable body 103 point along the Y direction and briefly run along the X direction.

The one or more lateral channels 138 of the rigid body 101 are configured to couple with respective angled capture sections 188A and 188B of the outer membrane 106 of the pliable crush perimeter 104. The one or more lateral channels 138 point along the X direction and run along the Y direction, while the angled capture sections 188A and 188B point along both the X direction and the Z direction (as they are "angled" as shown in FIG. 3) and run along the Y direction.

The tongue portion 141 of each respective corner 140A-140D of the rigid body 101 couples within an associated interior void 199 of each respective corner membrane 190A-190D of the pliable crush perimeter 104. Each tongue portion 141 and interior void 199 points along the X direction when along the first or second peripheral side 107A or 107B of the protective cover 100 and curves to point along the Y direction when transitioning towards a lateral side 130 of the rigid crush perimeter 102. Each tongue portion 141 and interior void 199 can be said to run along the Z direction.

The tongue portion 141 includes the plurality of corner coupling interlock elements 147 at the free end portion 142 thereof that couple with the plurality of complementary corner coupling interlock elements 197 of the pliable body 103; each of the plurality of corner coupling interlock elements 147 and the plurality of complementary corner coupling interlock elements 197 can substantially point along the X direction.

The cutout portion 144 of each respective corner 140 of the rigid body 101 points along the X direction along the first cutout segment 145 of the cutout portion 144 and changes direction to point along the Y direction along the second cutout segment 146. The first cutout segment 145 runs along the Z direction and couples with the associated pliable spacer 194 of the pliable body 103, which points along the X direction and runs along the Z direction.

Figure 2G:
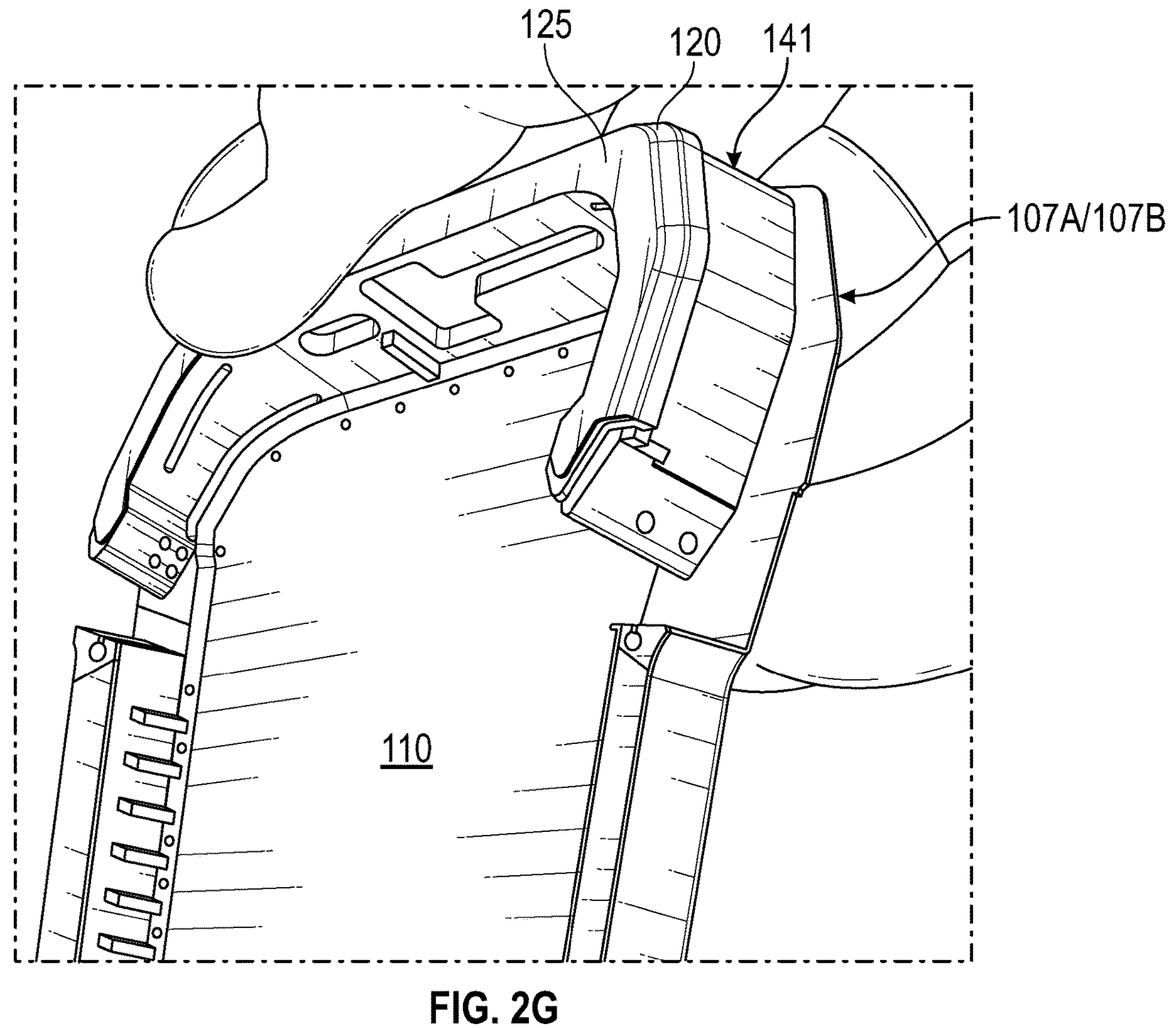
FIG. 2G is a photograph showing deflection of a first peripheral side of the protective case of FIG. 1A.

Methods:

In one method of manufacture of the protective cover 100, the rigid body 101 can be manufactured through conventional means such as additive methods, reductive methods, and/or molding. The pliable body 103 can be manufactured separately through molding and coupled with the rigid body 101, or can be manufactured through molding around the rigid body 101 to ensure proper interlock coupling and prevent decoupling of the pliable body 103 from the rigid body 101. The rigid body 101 can include a plastic material suitable for maintaining a rigid structure while being flexible enough for deflection of the first peripheral side 107A or the second peripheral side 107B as shown in FIG. 2G. The pliable body 103 can be of a plastic material suitable for molding and shock absorption, such as thermoplastic polyurethane (TPU).

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A protective cover for a mobile device, comprising:

a rigid body having a rigid crush perimeter, the rigid crush perimeter including one or more rigid crush ribs along a first peripheral side and a second peripheral side of the rigid body; and a pliable body that at least partially encapsulates the rigid crush perimeter, the pliable body including a pliable crush perimeter including one or more pliable crush ribs along the one or more rigid crush ribs of the rigid crush perimeter, wherein the one or more pliable crush ribs are configured to deform under impact to absorb impact forces, wherein the rigid crush perimeter including a rigid crush wall between the one or more rigid crush ribs, the rigid crush wall being encapsulated within an outer membrane of the pliable crush perimeter, and wherein the rigid crush perimeter includes a corner associated with the first peripheral side or the second peripheral side of the rigid body, and wherein the outer membrane of the pliable crush perimeter includes a corner membrane that encapsulates the corner.

2. The protective cover of claim 1, the rigid body including a web that spans the rigid crush perimeter, the web and rigid crush perimeter collectively defining a cavity configured to receive a mobile device therein.

3. The protective cover of claim 2, wherein the web includes one or more coupling sections that include a plurality of web perforations, and wherein the pliable crush perimeter includes a web window having an inner layer, an outer layer, and a plurality of web connectors that connect the inner layer to the outer layer through the plurality of web perforations.

4. The protective cover of claim 1, the pliable crush perimeter including an inner membrane that lines an interior of the rigid crush perimeter and contacts a mobile device when the mobile device is positioned within a cavity of the rigid body.

5. The protective cover of claim 4, wherein the inner membrane defines a display bezel that surrounds a display of the mobile device when the mobile device is captured within the cavity, the display bezel including a plurality of corner bezel reliefs configured to reduce stretching of the inner membrane.

6. The protective cover of claim 1, the pliable crush perimeter including an outer membrane, the outer membrane including the one or more pliable crush ribs that at least partially encapsulate an exterior of the rigid crush perimeter.

7. The protective cover of claim 6, the one or more pliable crush ribs extending beyond the rigid crush perimeter.

8. The protective cover of claim 6, the outer membrane including a pliable crush wall between the one or more pliable crush ribs, the pliable crush wall extending beyond the rigid crush perimeter.

9. The protective cover of claim 6, wherein a lateral side of the rigid crush perimeter includes an outer lateral surface, and wherein the outer membrane defines an angled capture section that captures a portion of the outer lateral surface of the lateral side of the rigid crush perimeter.

10. The protective cover of claim 1, wherein the corner membrane of the pliable crush perimeter includes an interior void that is configured to receive a tongue portion of a rigid crush rib of the rigid crush perimeter.

11. The protective cover of claim 1, wherein the corner of the rigid crush perimeter includes a tongue portion that terminates in a free end portion, the tongue portion being associated with a rigid crush rib of the rigid crush perimeter.

12. The protective cover of claim 11, wherein the free end portion of the tongue portion defines a plurality of corner coupling interlock elements and wherein the corner membrane includes a plurality of complementary corner coupling interlock elements that insert into the plurality of corner coupling interlock elements of the free end portion of the tongue portion.

13. The protective cover of claim 1, wherein the corner of the rigid crush perimeter includes a cutout portion that separates a tongue portion from a rear portion of the rigid crush perimeter and allows flexion of a rigid crush rib and a rigid crush wall of the rigid crush perimeter away from a default position.

14. The protective cover of claim 13, wherein a corner membrane of the pliable crush perimeter encapsulates the corner of the rigid crush perimeter and includes a pliable spacer that absorbs impact forces associated with flexion of the rigid crush rib and the rigid crush wall towards a cavity of the rigid crush perimeter.

15. The protective cover of claim 14, wherein the pliable spacer includes a complementary mechanical interlock element that engages a mechanical interlock element of a lateral side of the rigid crush perimeter to prevent decoupling of the rigid body from the pliable body during flexion of the rigid crush rib and the rigid crush wall of the rigid crush perimeter away from the default position.

16. A method, comprising:

forming a rigid body of a protective cover for a mobile device, the rigid body including:

a rigid crush perimeter, the rigid crush perimeter including one or more rigid crush ribs along a first peripheral side and a second peripheral side of the rigid body; and forming a pliable body of the protective cover around the rigid body that at least partially encapsulates the rigid crush perimeter, the pliable body including:

a pliable crush perimeter including one or more pliable crush ribs along the one or more rigid crush ribs of the rigid crush perimeter wherein the one or more pliable crush ribs are configured to deform under impact to absorb impact forces, wherein the rigid crush perimeter including a rigid crush wall between the one or more rigid crush ribs, the rigid crush wall being encapsulated within an outer membrane of the pliable crush perimeter, and wherein the rigid crush perimeter includes a corner associated with the first peripheral side or the second peripheral side of the rigid body, and wherein the outer membrane of the pliable crush perimeter includes a corner membrane that encapsulates the corner.

17. The method of claim 16, the pliable crush perimeter including an inner membrane that lines an interior of the rigid crush perimeter and contacts a mobile device when the mobile device is positioned within a cavity of the rigid body, wherein the inner membrane defines a display bezel that surrounds a display of the mobile device when the mobile device is captured within the cavity, the display bezel including a plurality of corner bezel reliefs configured to reduce stretching of the inner membrane.

18. The method of claim 16, wherein a corner of the rigid crush perimeter includes a cutout portion that separates a tongue portion from a rear portion of the rigid crush perimeter and allows flexion of a rigid crush rib and a rigid crush wall of the rigid crush perimeter away from a default position.

19. A protective cover for a mobile device, comprising:

a rigid body having a rigid crush perimeter, the rigid crush perimeter including one or more rigid crush ribs along a first peripheral side and a second peripheral side of the rigid body; and a pliable body that at least partially encapsulates the rigid crush perimeter, the pliable body including a pliable crush perimeter including one or more pliable crush ribs along the one or more rigid crush ribs of the rigid crush perimeter, wherein the one or more pliable crush ribs are configured to deform under impact toward the one or more rigid crush ribs to absorb impact forces, wherein the rigid crush perimeter including a rigid crush wall between the one or more rigid crush ribs, the rigid crush wall being encapsulated within an outer membrane of the pliable crush perimeter, and wherein the rigid crush perimeter includes a corner associated with the first peripheral side or the second peripheral side of the rigid body, and wherein the outer membrane of the pliable crush perimeter includes a corner membrane that encapsulates the corner.

* * * * *